J. G. GREENE.
Lamp.

No. 225,366. Patented Mar. 9, 1880.

Witnesses:
W. M. Rebasz, Jr.
A. R. Selden

Inventor:
James G. Greene,
by G. B. Selden,
Atty.

UNITED STATES PATENT OFFICE.

JAMES G. GREENE, OF ROCHESTER, NEW YORK, ASSIGNOR TO HARRY C. JONES AND EDWD. JAY SUGRU, OF SAME PLACE.

LAMP.

SPECIFICATION forming part of Letters Patent No. 225,366, dated March 9, 1880.

Application filed September 25, 1879.

*To all whom it may concern:*

Be it known that I, JAMES G. GREENE, of Rochester, Monroe county, New York, have invented certain Improvements in Combined Stand and Bracket Lamps, of which the following is a specification, reference being had to the annexed drawings, in which—

Figure 1:
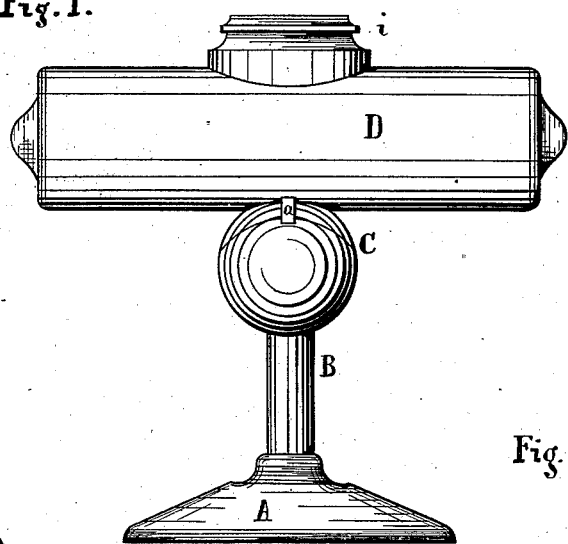
Figure 2:
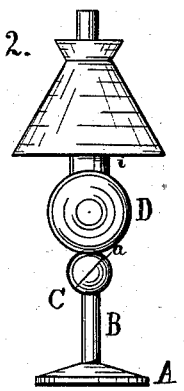
Figure 3:
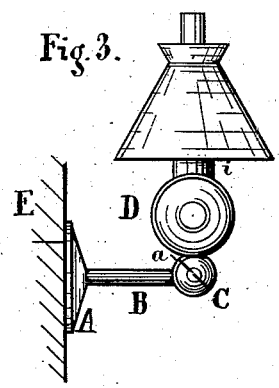
Figure 4:
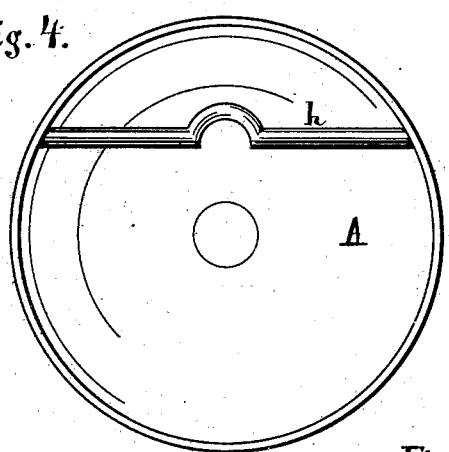
Figure 5:
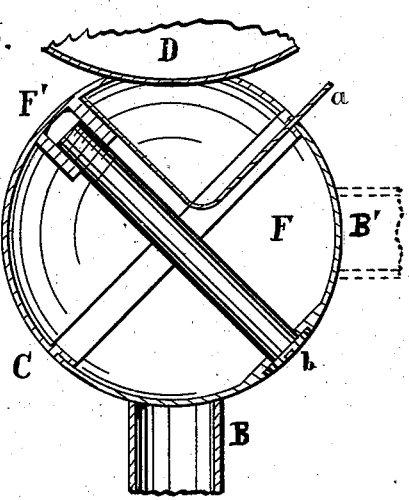
Figure 6:

Figure 1 is a side elevation of my improved stand and bracket lamp. Fig. 2 is an end elevation of the same. Fig. 3 is an end view of the same when used as a bracket-lamp. Fig. 4 is an inverted view of the lamp-base. Fig. 5 is a section through the diagonal joint in the lamp-standard. Fig. 6 is a portion of the side of the diagonal joint, showing the spring-catch for securing its parts in place.

My invention relates to an improvement in combined stand and bracket lamps; and it consists in a diagonal joint in the lamp-standard.

My improvement is represented in the accompanying drawings, in which A is the base or foot of the lamp. B is the standard, C the diagonal joint, and D the oil-reservoir. The lamp base and standard are constructed in any ordinary or desired manner. The oil-reservoir may be of any preferred form, and provided on its upper side with any suitable form of burner, chimney, and shade.

The standard B is made with a diagonal joint, C, the opposing surfaces of which are inclined at an angle of forty-five degrees with the vertical axis of the lamp, as seen in Fig. 2.

By rotating the standard on the joint C it may be placed at right angles with the axis of the burner-tube and chimney, as shown in Fig. 3.

In Fig. 5 is represented the joint C as formed by two hemispheres, F and F', secured together by the screw or rivet $b$, about which one of the hemispheres is free to rotate. The upper hemisphere, F', is secured to the oil-reservoir D, and the lower, F, to the standard B.

On giving the hemisphere F a half-revolution about the screw $b$ the standard B will be brought to the position indicated by dotted lines at B', Fig. 5, at right angles with its previous position. A bracket-lamp is thus formed out of what was previously a stand-lamp.

A spring, $a$, attached to one of the hemispheres, engages in notches (see Fig. 6) suitably placed in the margin of the other, for the purpose of fastening the two in the proper relative positions.

The spring $a$ may also be applied on the outside of the hemispheres in any convenient manner; or the spring may be omitted entirely if the joint be made to turn with sufficient friction.

The diagonal joint formed of two hemispheres, as herein shown, gives the lamp an ornamental appearance; but they may be dispensed with and plates or rings having suitable inclined surfaces substituted in their place.

The lower side of the base A may be provided with a bar, $h$, having a central loop by which to fasten the lamp on a suitable catch or hook in the wall or other support, E, Fig. 3.

The diagonal joint may be placed at any desired point in the standard B.

The oil-reservoir, instead of being rigidly connected to the joint or standard, may be supported by a suitable lamp-holder attached thereto so that it can be removed, if desired.

I claim—

A combined stand and bracket lamp having a diagonal joint between the base and reservoir, substantially as described.

JAMES G. GREENE.

Witnesses:
GEO. B. SELDEN,
W. M. REBARY, Jr.